(No Model.)

J. BATE.
TRICYCLE.

No. 364,466. Patented June 7, 1887.

WITNESSES:

INVENTOR:
J. Bate
BY Munn & Co.
ATTORNEYS.

UNITED STATES PATENT OFFICE.

JAMES BATE, OF NEWARK, NEW JERSEY.

TRICYCLE.

SPECIFICATION forming part of Letters Patent No. 364,466, dated June 7, 1887.

Application filed August 28, 1886. Serial No. 212,084. (No model.) Patented in England October 7, 1884, No. 13,294.

*To all whom it may concern:*

Be it known that I, JAMES BATE, of the city of Newark, in the county of Essex and State of New Jersey, have invented certain new and useful Improvements in Tricycles, of which the following is a full, clear, and exact description.

The object of this invention is to more conveniently arrange the driving and steering mechanism of the description of toy known as a "tricycle-horse."

Reference is to be had to the accompanying drawings, forming a part of this specification, in which similar letters of reference indicate corresponding parts in all the figures.

Figure 1:
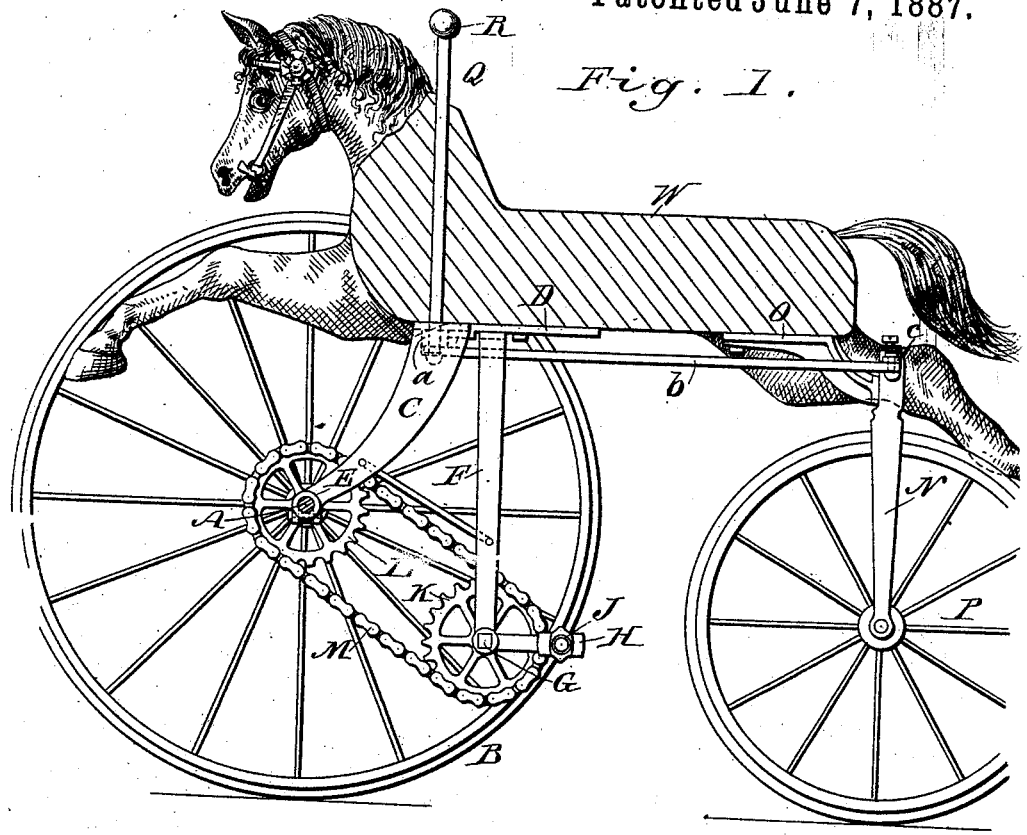
Figures 2, 3:
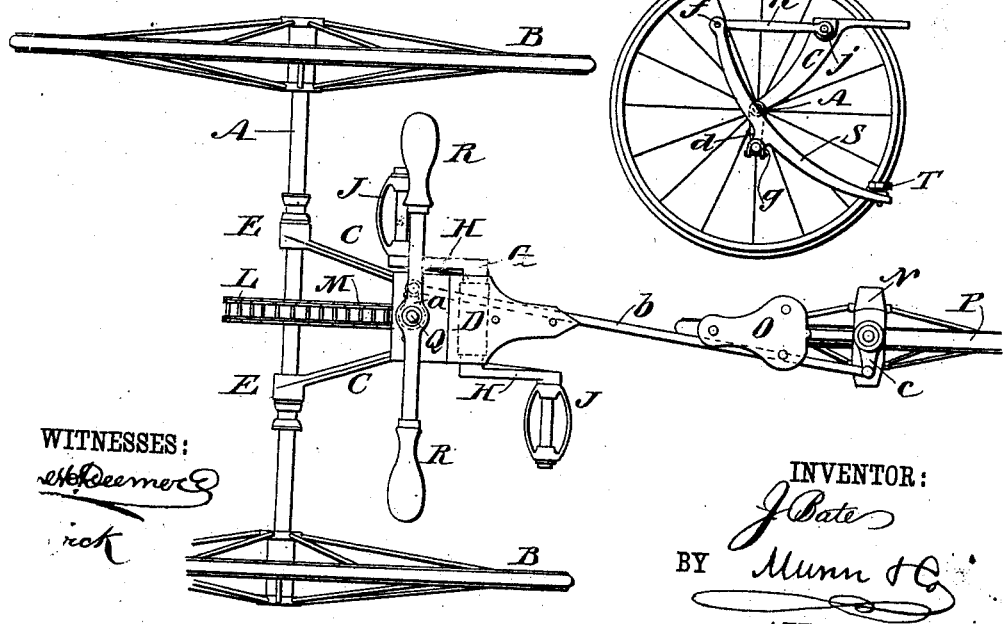

Figure 1 is a side elevation, with the near-side front wheel removed, of a tricycle-horse constructed according to this invention; and Fig. 2, a plan view thereof with the horse or corresponding part removed, so as to clearly show the mechanism thereunder; and Fig. 3 shows a modification of the treadle-power.

A is the driving-axle, and B B the ordinary wheels thereon.

C C are the sides of a fork carried down from a plate, D, fixed to the under side of the horse W or corresponding part, and E E are bearings at the bottom of such fork and carry the axle A.

F is a bracket carried down from the under side of the horse or corresponding part, and in bearings at the bottom ends of the sides of this bracket is carried an axle, G, having cranks H H on the ends thereof carrying treadles J J.

K is a pitched wheel carried upon the axle G between the bearings of the bracket F, and L is a corresponding wheel carried upon the axle A, and M a chain connecting these wheels. Motion is thus conveyed from the rider through the treadles J J, axle G, wheels K and L, and chain M to the driving-axle A of the machine.

N is a back fork, connected by means of a head or other suitable means to a bracket, O, fixed to the under side of the horse or corresponding part, and P is a hind steering-wheel carried in such fork.

Q is a vertical steering-spindle having a pair of steering-handles, R R, mounted on the top thereof. The steering-spindle Q passes downward through the horse or corresponding part and has a short lever, *a*, (shown by dotted lines only,) fixed to the bottom end thereof. This lever *a* is connected by means of the steering-rod *b* to a short lever, *c*, on the head of the steering-fork N, and thus motion is conveyed from the steering-handles R R to the steering-wheel P for steering the machine.

The levers *a* and *c* project, respectively, on opposite sides of the longitudinal center of the machine, so that the steering-handles may be moved to steer exactly as in the case of a bicycle. If both the levers project on the same side of the center, the steering-handles will be turned in the opposite direction to effect the same direction of steering.

It will be seen that the method of driving the tricycle from the saddle or seat is very convenient, as the exact position of the treadles in relation to such saddle or seat remains constant, and owing to the position of the treadles directly under the rider the latter is enabled to use his weight as the chief motive power, which is much less tiring than treadling with the legs in a slanting position, as is necessary with the ordinary tricycle-horse. The steering is also very conveniently effected immediately in front of the rider, though the steering-wheel is carried at the back. The position of the wheels in this invention, as described above, greatly lessens the risk of tipping over sidewise.

In lieu of the pitched wheels and chain illustrated, spur or friction wheels may be employed having an intermediate wheel between them to form the connection, or such intermediate wheel may be dispensed with and the remaining two wheels formed sufficiently large to gear into one another; but in this latter case, of course, the rider will have to treadle backward to propel the machine forward; or, if preferred or desired, the wheels may be entirely dispensed with and a crank or cranks employed in lieu thereof in each axle and connected by a rod or rods to convey the power from one axle to another.

A double-driver or balance-gear of any convenient construction may of course be employed to drive both the wheels B B instead of the arrangement described.

If desired, the axle G may be dispensed with and the driving-axle driven directly by a pair of reciprocating treadles. A convenient arrangement for accomplishing this is illustrated in Fig. 3, which is on a smaller scale than Figs. 1 and 2.

C is the bracket and A the driving-axle shown in Fig. 1. $d$ is a crank on the axle A. T is a treadle fixed to the rear end of the treadle-lever S, the front end of which is fulcrumed at $f$ to one extremity of rod $h$, of which the other extremity is hinged at $j$. This treadle-lever has formed upon it a shackle, $g$, by which it is connected with the crank. The axle is of course driven by a pair of treadle-levers and cranks similar to those shown. The above arrangement of parts may be modified as desired. For instance, the fulcrum $f$ may be a fixed point and the treadle-lever connected by a link to the crank.

A short lever may project opposite to the lever $a$, Figs. 1 and 2, and also to the lever $c$, respectively, if desired, and a second rod corresponding to the rod $b$ be fixed to connect such levers together, so as to give greater steadiness and security in steering.

The horse W, instead of being placed upon the bicycle, as shown in the drawings, may be reversed, if desired, and instead of an imitation horse an imitation of a dog or any other animal may be used for a seat.

Having thus fully described my invention, what I claim as new, and desire to secure by Letters Patent, is—

A tricycle comprising the body W, having the upright forks C N, secured to its under side at its opposite ends, the rear steering-wheel, P, the axle A, journaled in the fork C and having the two large wheels B and the chain-wheel L, the bracket F, depending from the under side of the body approximately in line with the seat, shaft G in the lower end of the bracket, provided with the cranks H and treadles J, the chain-wheel K, the chain M, the steering-rod Q, extending down through the neck of the body and in connection on the upper end of the bracket N, substantially as set forth.

JAMES BATE.

Witnesses:
OWEN A. GALVIN,
FRANK FITZPATRICK.